United States Patent
Otsubo

(10) Patent No.: US 12,330,559 B2
(45) Date of Patent: Jun. 17, 2025

(54) DISPLAY APPARATUS, CONTROL METHOD, AND STORAGE MEDIUM FOR A HYBRID MIRROR

(71) Applicant: CANON KABUSHIKI KAISHA, Tokyo (JP)

(72) Inventor: Masatoshi Otsubo, Tochigi (JP)

(73) Assignee: Canon Kabushiki Kaisha, Tokyo (JP)

( * ) Notice: Subject to any disclaimer, the term of this patent is extended or adjusted under 35 U.S.C. 154(b) by 16 days.

(21) Appl. No.: 18/325,874

(22) Filed: May 30, 2023

(65) Prior Publication Data
US 2023/0391259 A1 Dec. 7, 2023

(30) Foreign Application Priority Data
Jun. 2, 2022 (JP) .................... 2022-090422

(51) Int. Cl.
*H04N 7/18* (2006.01)
*B60R 1/04* (2006.01)
*B60R 1/12* (2006.01)

(52) U.S. Cl.
CPC .............. *B60R 1/12* (2013.01); *B60R 1/04* (2013.01); *B60R 2001/1215* (2013.01); *B60R 2300/602* (2013.01); *B60R 2300/8066* (2013.01)

(58) Field of Classification Search
CPC ........................................ B60R 1/12
USPC ........................................ 348/148
See application file for complete search history.

(56) References Cited

U.S. PATENT DOCUMENTS

| | | | |
|---|---|---|---|
| 9,073,493 B1 * | 7/2015 | Yun ............... | G02B 7/1827 |
| 2002/0003571 A1 * | 1/2002 | Schofield ......... | B60R 1/04 |
| | | | 348/148 |
| 2009/0066842 A1 * | 3/2009 | Hattori ............ | G06T 3/047 |
| | | | 348/607 |
| 2013/0128047 A1 * | 5/2013 | Lee ................ | B60R 1/28 |
| | | | 348/148 |
| 2017/0080868 A1 * | 3/2017 | Oishi ............. | B60R 1/08 |
| 2017/0253186 A1 * | 9/2017 | Nakai ............. | B60R 1/02 |
| 2018/0272940 A1 * | 9/2018 | Saeki ............. | G06V 20/58 |
| 2019/0241126 A1 * | 8/2019 | Murad ............ | B60R 1/12 |
| 2019/0308562 A1 * | 10/2019 | Yamada .......... | B60R 11/04 |
| 2019/0329718 A1 * | 10/2019 | Kanaya .......... | B60D 1/36 |
| 2020/0180511 A1 * | 6/2020 | Kanagaraj ....... | B60R 1/04 |
| 2020/0324702 A1 * | 10/2020 | Lien .............. | H04N 23/57 |

(Continued)

FOREIGN PATENT DOCUMENTS

JP 2014198531 A 10/2014

*Primary Examiner* — Leron Beck
(74) *Attorney, Agent, or Firm* — Canon U.S.A., Inc. IP Division

(57) ABSTRACT

A display apparatus includes a display that displays an image captured by an imaging unit that captures an image of a view behind a moving object, a half mirror that reflects the view behind the moving object and disposed on an anterior surface of the display, one or more memories storing instructions, and one or more processors executing the instructions to switch a state between a mirror surface display state where a reflection image on the half mirror is displayed and an image display state where the image is displayed on the display and perform adjustment so that a viewing angle of the image displayed on the display and a viewing angle reflected by the half mirror are approximately the same as each other while switching the state between the mirror surface display state and the image display state.

19 Claims, 8 Drawing Sheets

(56) References Cited

U.S. PATENT DOCUMENTS

2021/0009037 A1\* 1/2021 Kosugi .................. H04N 7/183
2022/0340166 A1\* 10/2022 Kume ............. B60W 30/18163

\* cited by examiner

FIG.7
701
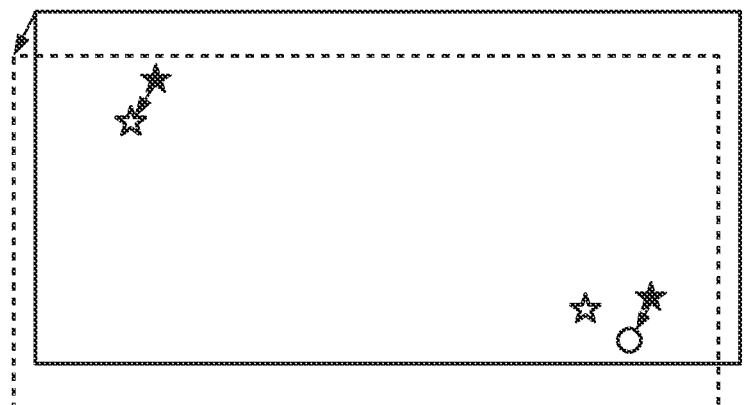
702
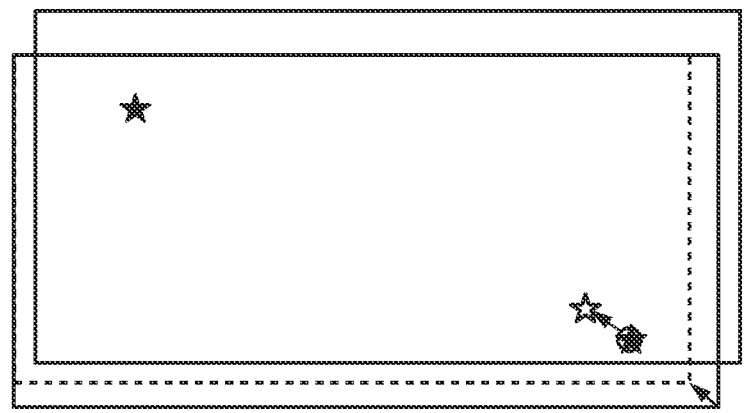
703

DISPLAY APPARATUS, CONTROL METHOD, AND STORAGE MEDIUM FOR A HYBRID MIRROR

BACKGROUND

Field

The present disclosure relates to a display apparatus mounted on a moving object.

Description of the Related Art

In recent years, there has been proposed a hybrid mirror having a function of a conventional rearview mirror and a function of an electronic mirror. For example, the hybrid mirror can switch between the two functions, i.e., the hybrid mirror functions as a rearview mirror in the daytime (bright time) and as an electronic mirror in the dark time (nighttime).

Japanese Patent Application Laid-Open No. 2014-198531 discusses a technique for detecting the viewpoint of a driver and the attachment angle of a rearview mirror, and changing the display-viewing angle and size of an electronic mirror so that the display-viewing angle of the electronic mirror coincides with the viewing angle reflected in the rearview mirror.

With the technique discussed in Japanese Patent Application Laid-Open No. 2014-198531, it is difficult that both viewing angles are adjusted to be the same without accurately maintaining the relative positional relation between the attachment position and angle of the camera for the electronic mirror installed in the rear of a vehicle and the rearview mirror. There has been an issue that it is difficult for a user to adjust the viewing angle of the video displayed on the electronic mirror and the range visually recognizable in the rearview mirror to coincide with each other.

SUMMARY

According to an aspect of the present disclosure, a display apparatus includes a display configured to display an image captured by an imaging unit configured to capture an image of a view behind a moving object, a half mirror configured to reflect the view behind the moving object and disposed on an anterior surface of the display, one or more memories storing instructions, and one or more processors executing the instructions to switch a state between a mirror surface display state where a reflection image on the half mirror is displayed and an image display state where the image is displayed on the display and perform adjustment so that a viewing angle of the image displayed on the display and a viewing angle reflected by the half mirror are approximately the same as each other while switching the state between the mirror surface display state and the image display state.

Further features will become apparent from the following description of exemplary embodiments with reference to the attached drawings.

BRIEF DESCRIPTION OF THE DRAWINGS

FIG. 7 illustrates processing in steps S517 and S527.

DESCRIPTION OF THE EMBODIMENTS

Figure 1:
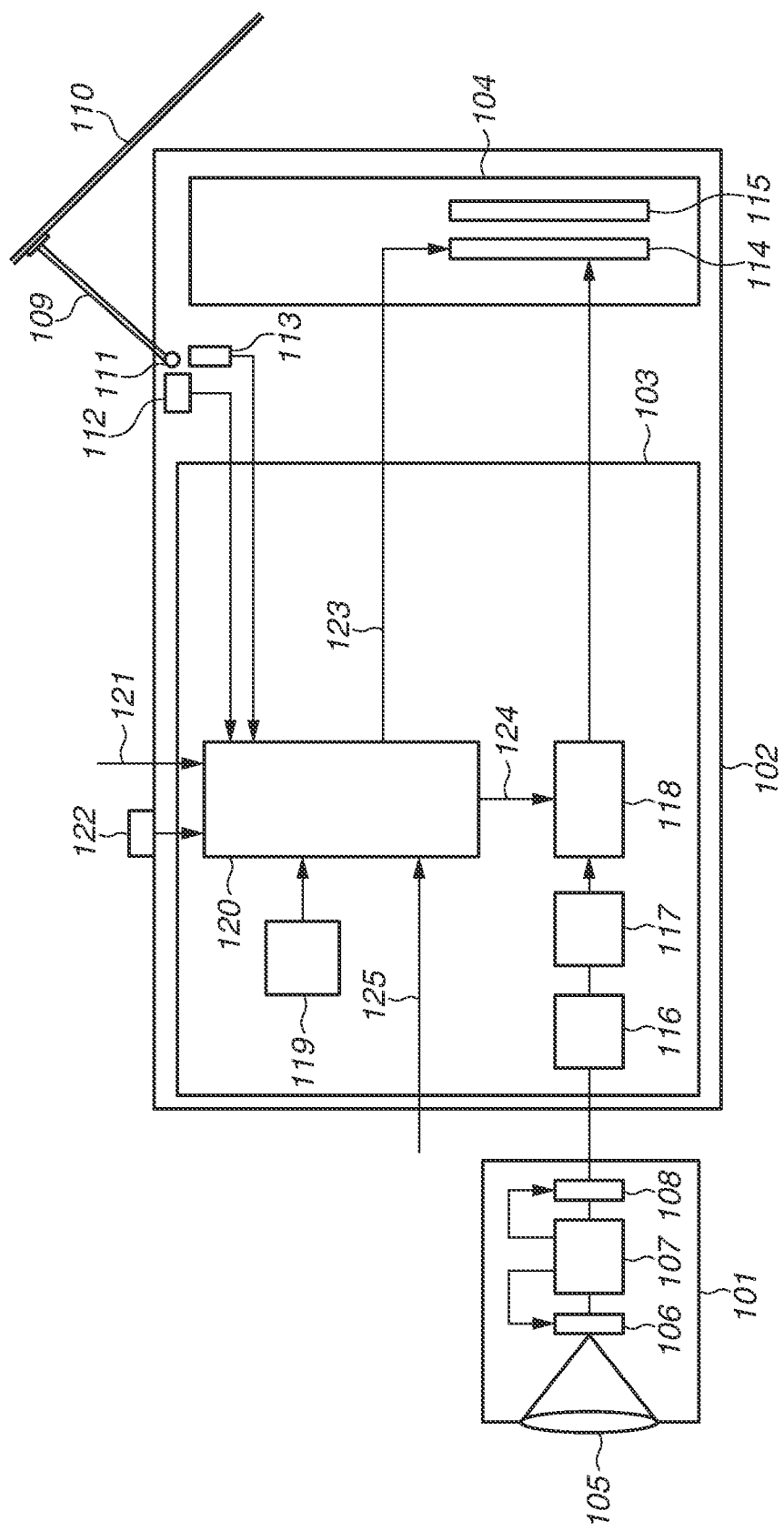
FIG. 1 illustrates an example configuration of an image display apparatus.
Figure 8:
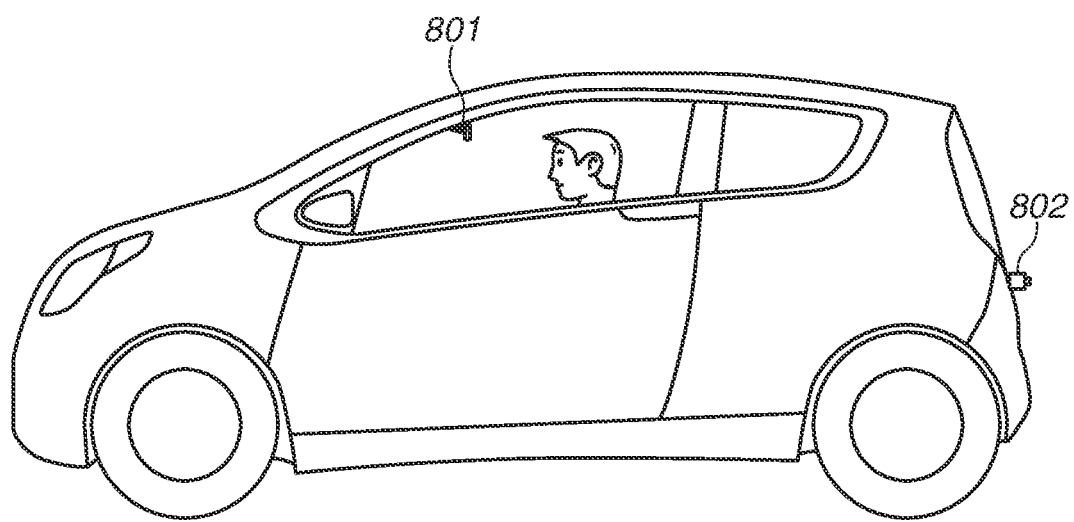
FIG. 8 illustrates an example of a lateral view of a moving object according to a first exemplary embodiment.

A first exemplary embodiment of the present invention will be described below. FIG. 1 is a block diagram illustrating an image display apparatus. The image display apparatus includes a camera 101 and a main body 102. The main body 102 includes an image processing unit 103 and a display unit 104. FIG. 8. illustrates a state where the camera 101 and the main body 102 are attached to a vehicle, which is an example of a moving object. The camera 101 is attached at a position 802 in the rear of the vehicle. A video output from the camera 101 is wired to the main body 102 installed at a position 801. The main body 102 displays video of the view behind the vehicle.

The camera 101 includes a lens 105, a sensor 106, a camera control unit 107, and a video signal transmission unit 108. The camera 101 captures video of the view behind the vehicle that is displayed on the display unit 104. The lens 105 is configured to capture an image with a viewing angle wider than the range viewable by the driver from the driver's seat with the changed orientation of the rearview mirror. While FIG. 1 illustrates a single lens, the lens 105 actually includes a plurality of lenses.

The sensor 106 of the present exemplary embodiment is a Complementary Metal Oxide Semiconductor (CMOS) sensor having an RGB Bayer array and is provided with approximately 8 million pixels. While a CMOS sensor is described, any sensor that would enable practice of the present exemplary embodiment is applicable. The number of pixels is not seen to be limiting. The number of pixels needs to be large enough to provide a sufficient resolution even when image clipping processing is performed by the image processing unit 103 in the subsequent stage and an image is displayed on the display unit 104. The type of the color filter of the sensor 106 is not limited to an RGB Bayer array, and can be any type of array that would enable practice of the present exemplary embodiment, such as an RCCB array.

The camera control unit 107 controls the sensor 106, subjects the signal output from the sensor 106 to correction processing, and controls the video signal transmission unit 108 (described below). Examples of controlling the sensor 106 include setting a voltage to be applied to the sensor 106, performing automatic exposure control for detecting a luminance and applying a feedback to an exposure time of the sensor 106, and controlling a gain function built in the sensor 106. According to the present exemplary embodiment, the video signal transmission unit 108 uses noise-immune Low Voltage Differential Signaling (LVDS) that enables long-distance transmission. Since the camera 101 is installed in the rear of the vehicle and the main body 102 (described below) is installed at the position of the rearview mirror, the long-distance transmission path requires sufficient noise immunity. While the present exemplary embodiment uses the LVDS signal, this is not seen to be limiting. Other signal formats enabling high-speed transmission over a long distance from the rear of the vehicle to the rearview mirror position are applicable.

The signal flow starting from the camera 101 is described below. The light flux captured by the lens 105 is focused in the sensor 106 and then input to the camera control unit 107 as an RGB signal. The RGB signal corrected by the camera control unit 107 is sent to the video signal transmission unit 108, and then sent to the main body 102 in the LVDS signal format.

The main body 102 includes the image processing unit 103 and the display unit 104. Like conventional rearview mirrors, an arm 109 extending from the main body 102 is bonded and fixed to a windshield 110. An angle adjustment mechanism 111 for freely changing the pan and tilt of the main body 102 is attached at the end of the arm 109. A pan encoder 112 and a tilt encoder 113 are connected with the angle adjustment mechanism 111. These encoders detect whether the driver has changed the angle of the main body 102. While the present exemplary embodiment uses encoders, a gyro or an angular velocity sensor that can detect the angle of the rearview mirror changed by the driver is also applicable. Contents to be detected will be described below with respect to the descriptions of the image processing unit 103.

The display unit 104 of the main body 102 will now be described. The display unit 104 includes a liquid crystal display (LCD) 114 and a half mirror 115. The liquid crystal display 114 includes a Light Emitting Diode (LED) as a back light, and is turned ON or OFF following an instruction from the image processing unit 103. The LCD 114 displays the video signal transmitted from the image processing unit 103. The present exemplary embodiment implements full High Definition (HD) color with a resolution of 1920×1080, but any color/resolution combination that would enable practice of the present exemplary embodiment is applicable.

When the back light of the LCD 114 is OFF, the half mirror 115 functions as a mirror. When the back light is bright, the light from the LCD 114 becomes dominant, and the half mirror 115 functions as a normal transmitting glass.

The image processing unit 103 will now be described. The image processing unit 103 includes a video signal reception unit 116, a development processing unit 117, an image clipping unit 118, a data holding unit 119, and an image processing control unit 120.

The video signal reception unit 116 receives the LVDS signal transmitted from the camera 101, demodulates an RGB signal, and transmits the RGB signal to the development processing unit 117. The development processing unit 117 generates a YUV signal based on the RGB signal. More specifically, the development processing unit 117 subjects the RGB signal with the Bayer array to de-Bayer processing, YUV conversion processing (through a matrix circuit D), gamma processing, and other development processing performed by common cameras, and transmits the RGB signal to the image clipping unit 118. The image clipping unit 118 clips an image based on an image clipping range parameter (described below). The data holding unit 119 stores the image clipping range parameter.

Figure 2:
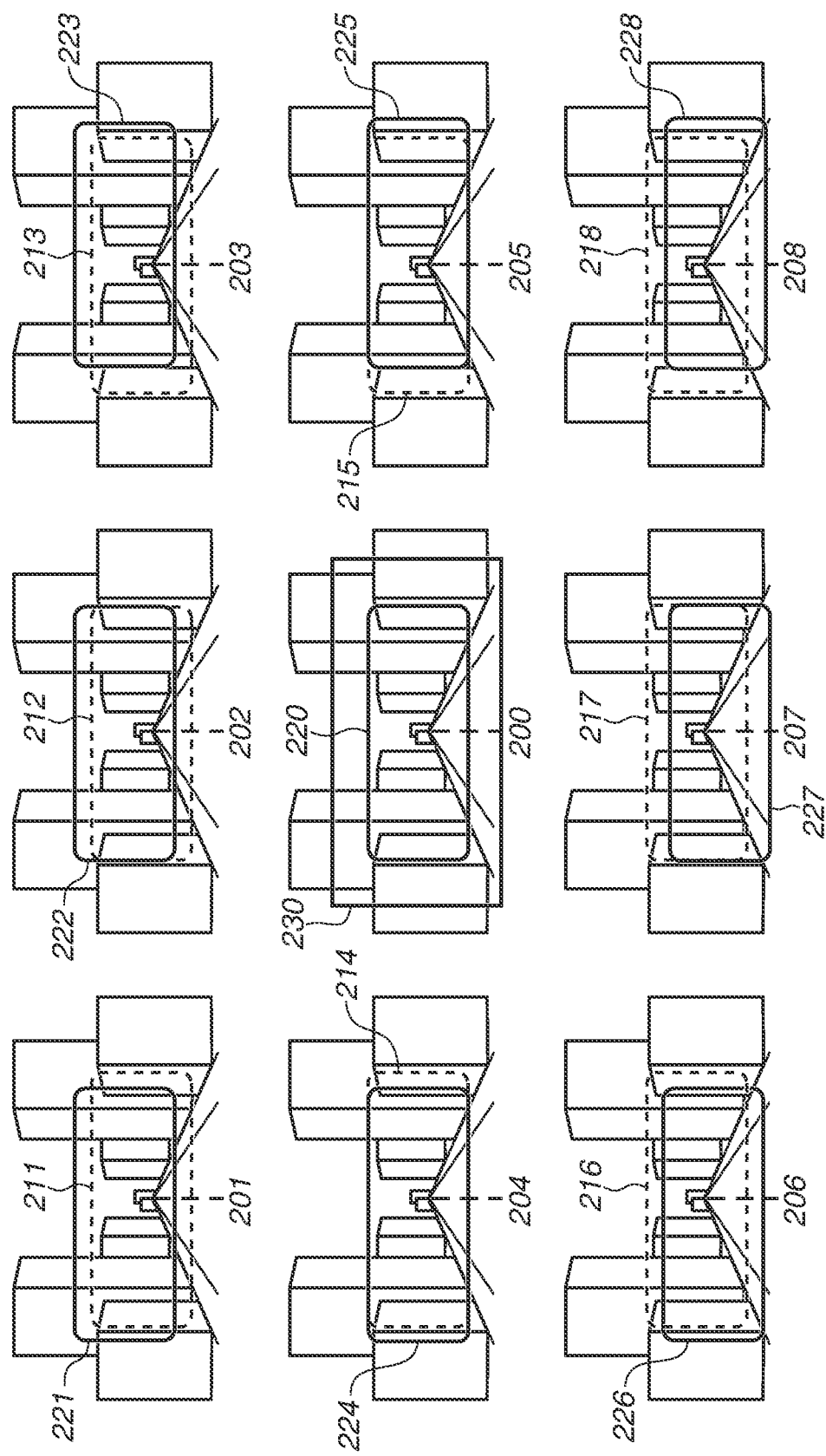
FIG. 2 illustrates an example of an image clipping range parameter.

FIG. 2 illustrates the image clipping range parameter. Images 200 to 208 indicate the background behind the vehicle visible to the naked eye. A full frame 230 in the image 200 indicates the entire viewing angle range captured by the camera 101 in FIG. 1.

A clipping frame 220 indicates the default clipping range clipped by the image clipping unit 118 in FIG. 1 out of the full frame 230. Broken-line frames 211 to 218 indicate clipping positions of the clipping frame 220 in the images 201 to 208, respectively. Clipping frames 221 to 228 indicate clipping ranges in the images 201 to 208, respectively. The image clipping range parameter indicates the ranges of the clipping frames 220 to 228, and stores the coordinates of the upper left and the lower right corners of the clipping frames 220 to 228 assuming that the coordinates of the upper left corner of the full frame 230 are (0, 0). The use of the image clipping range parameter will be described below.

The image processing control unit 120 in FIG. 1 will now be described. Input and output elements of the image processing control unit 120 will be described below with reference to FIG. 1. A vehicle state input 121 is an input terminal for inputting the driving state of the vehicle. According to the present exemplary embodiment, the vehicle state input 121 inputs statuses "P: Parking", "R: Reverse", and "D: Drive", which are selected with a shift lever (not illustrated). The input terminal for inputting the encoder values of the pan encoder 112 and the tilt encoder 113 is used to detect whether the driver has changed the angle of the main body 102 when the driver starts driving.

The data holding unit 119 stores the image clipping range parameter as information about the frame for image clipping. The image processing control unit 120 can extract the information about the clipping frame based on the frame information for each address. A clipping determination button 122 is selected by the driver when the driver determines that the viewing angle of the rearview mirror and the viewing angle of the electronic mirror are approximately the same. Timing will be described below.

A display ON/OFF output 123 turns the back light of the LCD 114 ON or OFF. A clipping frame setting output 124 outputs information about the clipping frame to be set to the image clipping unit 118. An outdoor luminance input 125 is a terminal for inputting the output signal from a detector (not illustrated) for detecting the outdoor luminance. According to the present exemplary embodiment, the outdoor luminance input 125 inputs signals that turn ON in conjunction with the headlight (dimmer) and the front position lights pre-installed on the vehicle.

Figure 3:
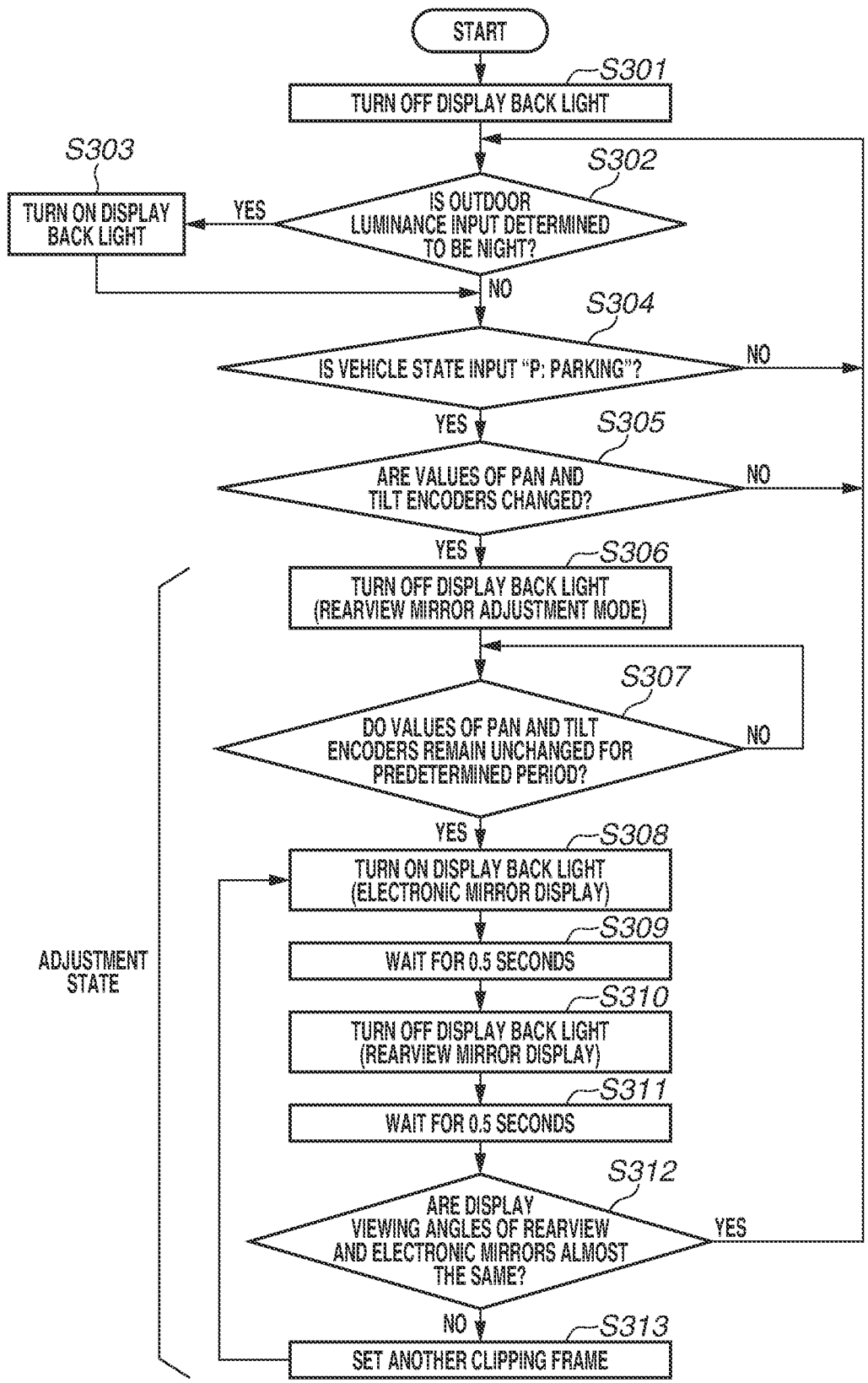
FIG. 3 is a flowchart illustrating an example operation of an image processing control unit.

The flowchart in FIG. 3 is implemented when a CPU (not illustrated) in the image processing control unit 120 calls the program corresponding to the processing contents from a read only memory (ROM), loads the program into a random access memory (RAM), and executes the program. When the driver starts the vehicle's engine, the CPU starts this flowchart, i.e., the processing proceeds to step S301.

In step S301, the image processing control unit 120 turns OFF the back light of the display 114. This processing is equivalent to initialization processing, and additional initialization process are also executed.

In step S302, the image processing control unit 120 determines the outdoor luminance based on the outdoor luminance input 125. When the image processing control unit 120 determines that the outdoor luminance is bright (NO in step S302), the processing proceeds to step S304. When the image processing control unit 120 determines that the outdoor luminance is dark (YES in step S302), the processing proceeds to step S303.

In step S303, the image processing control unit 120 turns ON the back light of the display 114. The processing then proceeds to step S304.

Processing in steps S304 and S305 determines whether the adjustment mode can be selected. In step S304, the image processing control unit 120 determines whether the vehicle is in a parking state (P: Parking) based on the vehicle state input 121. In step S305, the image processing control unit 120 determines whether the driver has adjusted the angle of the rearview mirror. An example case where a deviation occurs between the display viewing angle of the rearview mirror and the display viewing angle of the electronic mirror is a case where a different driver adjusts the rearview mirror. The image processing control unit 120 detects such a deviation in steps S304 and S305. When the image processing control unit 120 detects a deviation between the display viewing angles of the rearview mirror and the electronic mirror (YES in steps S304 and S305), the processing proceeds to step S306. If not deviation is detected, the flow returns to step S302.

In step S306, the image processing control unit 120 changes the current mode to the adjustment mode for adjusting the viewing angle. At this time, the image processing control unit 120 turns OFF the back light of the display 114.

In step S307, the image processing control unit 120 waits until the driver completes adjusting the angle of the rearview mirror. When the image processing control unit 120 determines that the driver completes adjusting the angle of the rearview mirror (YES in step S307), the processing proceeds to step S308. In step S308, the image processing control unit 120 turns ON the back light of the display 114 to select the electronic mirror display mode.

In step S309, the image processing control unit 120 holds the current state for a predetermined time, e.g., about 0.5 seconds. In step S310, the image processing control unit 120 turns OFF the back light of the display 114 to select the rearview mirror display mode again.

In step S311, the image processing control unit 120 holds the current state for a predetermined time, e.g., about 0.5 seconds. In step S312, the image processing control unit 120 displays a message prompting the driver to check whether the viewing angle of the rearview mirror and the viewing angle of the electronic mirror are approximately the same. When the driver selects the clipping determination button 122 to complete adjusting the viewing angle, the image processing control unit 120 completes the adjustment processing. When the image processing control unit 120 completes the adjustment mode (YES in step S312), the processing returns to step S302.

When the driver does not select the clipping determination button 122 (NO in step S312), the processing proceeds to step S313. In step S313, the image processing control unit 120 acquires another clipping frame from the image clipping range parameter prepared in the data holding unit 119. The processing then returns to step S308.

The method for selecting the clipping frame according to the present exemplary embodiment sequentially selects the clipping frames 220 to 228. When the driver does not select the clipping determination button 122 after selecting all of the clipping frames 220 to 228, the driver re-selects the clipping frames from the clipping frame 220.

The above-described series of processing enables switching the mode between the rearview mirror display mode and the electronic mirror display mode, enabling the driver to check whether the viewing angles are the same. Each time the electronic mirror display mode is selected, the image processing control unit 120 sequentially changes the image clipping range parameter prepared in the data holding unit 119 to change the display viewing angle, making it easier for the driver to check whether the viewing angle of the rearview mirror and the viewing angle of the electronic mirror are the same.

According to the present exemplary embodiment, it is not necessary to strictly match the mechanical relative relation between the camera 101 installed in the rear of the vehicle and the main body 102 installed at the position of the rearview mirror. Thus, the camera 101 and the main body 102 can both be easily installed.

Figure 4:
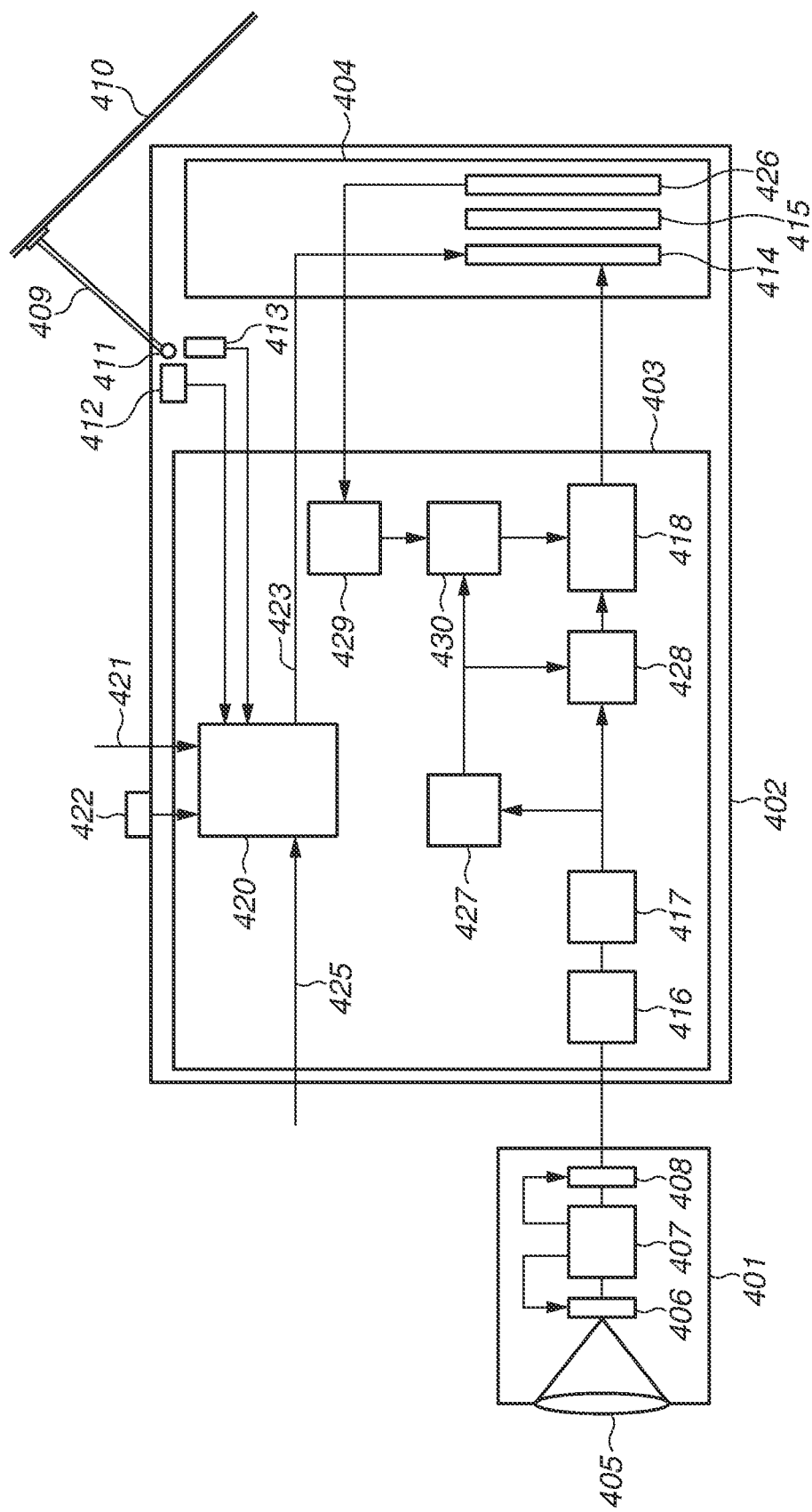
FIG. 4 illustrates an example configuration of the image display apparatus.

A second exemplary embody=ment of the present invention will be described below. FIG. 4 illustrates a configuration of the image display apparatus according to the present exemplary embodiment. The image display apparatus includes a camera 401 and a main body 402 that includes an image processing unit 403 and a display unit 404. FIG. 8 illustrates a state where the camera 401 and the main body 402 are attached to a vehicle. The camera 401 is attached at the position 802 in the rear of the vehicle. The video output from the camera 401 is wired to the main body 402 installed at the position 801. Thus, the main body 802 displays video of the view behind the vehicle.

The camera 401 includes a lens 405, a sensor 406, a camera control unit 406, and a video signal transmission unit 408, and has the same configuration as that of the camera 101 including the lens 105, the sensor 106, the camera control unit 107, and the video signal transmission unit 108 in FIG. 1. The function and the attachment position of the camera 401 are the same as those of the camera 101 according to the first exemplary embodiment, and redundant descriptions of the camera 401 according to the second exemplary embodiment will be omitted.

The main body 402 includes an image processing unit 403 and a display unit 404. Like conventional rearview mirrors, an arm 409 extending from the main body 402 is bonded and fixed to a windshield 410. An angle adjustment mechanism 411 for freely adjusting the pan and tilt of the main body 402 is attached at the end of the arm 409. A pan encoder 412 and a tilt encoder 413 are connected with the angle adjustment mechanism 411 to detect whether the driver has changed the angle of the main body 402. While the present exemplary embodiment uses encoders, a gyro or an angular velocity sensor capable of detecting the angle of the rearview mirror changed by the driver is also applicable. Contents to be detected will be described below in the descriptions of the image processing unit 403, which performs central processing of the present exemplary embodiment.

The display unit 404 of the main body 402 will now be described. The display unit 404 includes a liquid crystal display (LCD) 414, a half mirror 415, and a touch panel 426. The LCD 414 includes a LED as the back light, and is turned ON or OFF based on an instruction from the image processing unit 403 (described below). The LCD 414 displays the video signal transmitted from the image processing unit 403. The present exemplary embodiment adopts full HD color with a resolution of 1920×1080. This is not seen to be limiting and any color/resolution combination enabling implementation of the present exemplary embodiment is applicable.

When the back light of the LCD 414 is OFF or when the back light is dark, the half mirror 415 functions as a mirror. When the back light of the LCD 414 is bright, the light from the LCD 414 becomes dominant, and the half mirror 415 functions as a normal transmitting glass. According to the present exemplary embodiment, a state where the back light of the LCD 414 is OFF or the back light is dark, i.e., a state where the half mirror 415 functions as a mirror, is referred to as a mirror surface display state. A state where the back light of the LCD 414 is bright, i.e., a state where the half mirror 415 functions as a normal transmitting glass, is referred to as an image display state. In the image display state, the image displayed on the LCD 414 is recognized by the user.

A touch panel 426 outputs a voltage signal corresponding to a touched position on the panel. Touch positions and timings will be described below. The signal is transmitted to the image processing unit 403. The image processing unit 403 will now be described. The image processing unit 403 includes a video signal reception unit 416, a development processing unit 417, a feature point detection circuit 427, a feature point superimposition circuit 428, an image clipping enlargement/reduction unit 418, a touch coordinates calculation unit 429, an image clipping enlargement/reduction calculation unit 430, and an image processing control unit 420. A vehicle state input 421 is an input terminal for inputting the driving state of the vehicle. According to the present exemplary embodiment, the vehicle state input 421 inputs statuses "P: Parking", "R: Reverse", and "D: Drive", which are selected with a shift lever (not illustrated). A clipping determination button 422 is selected by the driver when the driver determines that the viewing angle of the rearview mirror and the viewing angle of the electronic mirror are approximately the same.

A display ON/OFF output 423 turns the back light of the LCD 414 ON or OFF. An outdoor luminance input 425 is a terminal for inputting the output signal from a detector (not illustrated) for detecting the outdoor luminance. According to the present exemplary embodiment, the outdoor luminance input 425 inputs signals that turn ON in conjunction with the headlight (dimmer) and the front position lights pre-installed on the vehicle. The video signal reception unit 416 receives the LVDS signal transmitted from the camera 401, generates an RGB signal, and transmits the RGB signal to the development processing unit 417. The development processing unit 417 generates a YUV signal based on the RGB signal. More specifically, the development processing unit 117 subjects the RGB signal with the Bayer array to de-Bayer processing, YUV conversion processing (through a matrix circuit D), gamma processing, and other development processing performed by common cameras, and transmits the RGB signal to the feature point detection circuit 427 and the feature point superimposition circuit 428.

The feature point detection circuit 427 detects, from the target pixel to surrounding pixels in the input video, portions having a large luminance or color variation as feature points, and calculates the center coordinates. The present exemplary embodiment recognizes portions detected using the above-described method as feature points. However, the SIFT algorithm, the AKAZE algorithm, and other general-purpose feature point extraction algorithms can be used, and no special processing is required.

The feature point coordinates detected by the feature point detection circuit 427 are transmitted to the feature point superimposition circuit 428 and the image clipping enlargement/reduction calculation unit 430. The feature point superimposition circuit 428, focusing on several feature points based on information about the feature point coordinates from the feature point detection circuit 427, superimposes the input video from the development processing unit 417 with marks of feature points, and transmits the video to the image signal clipping enlargement/reduction unit 418. Methods for focusing on and displaying feature points will be described below.

The touch coordinates calculation unit 429 converts the voltage signal from the touch panel 426 into touch coordinates and transmits the touch coordinates to the image clipping enlargement/reduction calculation unit 430. The image clipping enlargement/reduction calculation unit 430 acquires the range of video clipping and the degree of enlargement and reduction for adjusting the viewing angle of the rearview mirror and the viewing angle of the electronic mirror to be the same based on the touch coordinates from the touch coordinates calculation unit 429 and the feature point coordinates from the feature point detection circuit 427. The image clipping enlargement/reduction calculation unit 430 calculates the parameter of the image clipping enlargement/reduction unit 418. A method for calculating this parameter will be described below.

The image clipping enlargement/reduction unit 418 performs image clipping and enlargement/reduction based on the parameter of the image clipping enlargement/reduction calculation unit 430 and displays the image on the LCD 414. A method for adjusting the viewing angle of the electronic mirror to be the same as the viewing angle of the rearview mirror will be described below.

Figure 5:
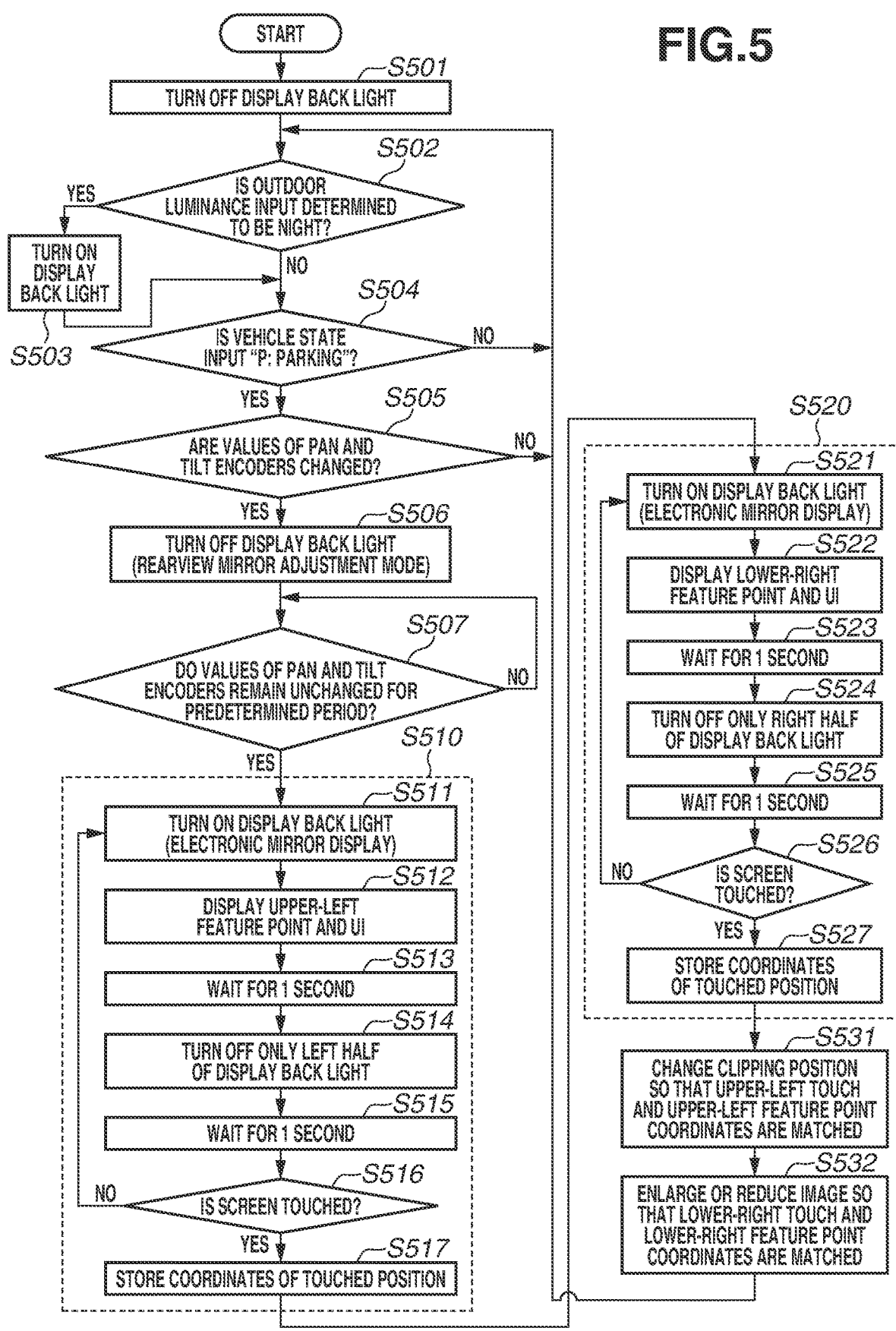
FIG. 5 illustrates another example of a flowchart for adjusting the viewing angle of a rearview mirror and the viewing angle of an electronic mirror to be the same as each other.
Figure 6:
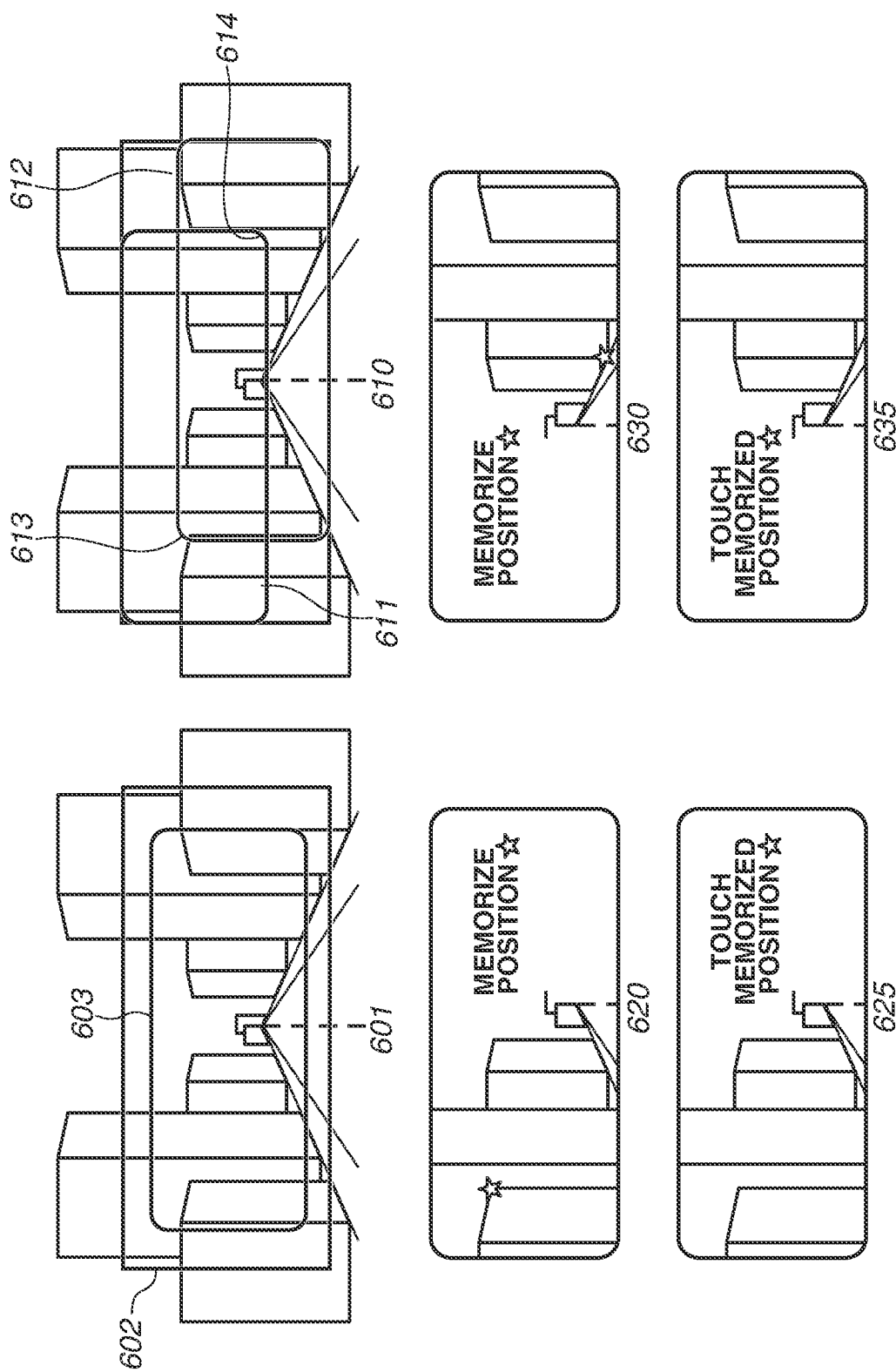
FIG. 6 illustrates an example of a user interface displayed in processing in the flowchart in FIG. 5.

FIG. 5 is a flowchart illustrating processing for adjusting the viewing angle of the electronic mirror to be approximately the same as the viewing angle of the rearview mirror. This flowchart is implemented when a CPU (not illustrated) in the image clipping enlargement/reduction calculation unit 430 calls a program corresponding to the processing contents from a ROM, loads the program into a RAM, and executes the program. FIG. 6 illustrates user interfaces displayed during the processing of the flowchart in FIG. 5.

Processing in steps S501 to S507 in FIG. 5 is similar to the processing in steps S301 to S307 in FIG. 3, respectively, and redundant descriptions thereof will be omitted. Step S510 is a processing group for detecting the position in the rearview mirror where the upper-left feature point of the screen is displayed. Step S520 is a processing group for detecting the position in the rearview mirror where the lower-right of the screen is displayed.

Turning to the processing group of step S510, in step S511, the image processing control unit 420 turns ON the back light of the display 414 to select the electronic mirror display mode. In step S512, the image processing control unit 420 displays one feature point at the upper-left corner of the electronic mirror and a UI. The UI will now be described with reference to FIG. 6.

A scenery 601 indicates the scenery behind the vehicle. A frame 602 indicates the full viewing angle captured by the camera 401 installed in the rear of the vehicle. A frame 603 indicates the range of the viewing angle to be clipped by the image clipping enlargement/reduction calculation unit 430.

A scenery 610 indicates a state 611 where the clipping range is set at the upper-left position of the full viewing angle, and a state 612 where the clipping range is set at the lower-right position of the full viewing angle. A corner 613 indicates the upper-left corner of a frame 612, and a corner 614 indicates the lower-right corner of a frame 611. The corners 613 and 614 are used for the selection of a feature point.

A screen 620 displays the user interface displayed in step S512.

The right-hand side of the screen 620 displays a black character string "Memorize Position *" without displaying the image captured by the camera 401. The position "*" indicates the coordinates where the feature point detection circuit 427 detects a feature point. A plurality of points is selected after the feature point is extracted from the video. According to the present exemplary embodiment, the feature point closest to the corner 613 from among the feature points lower and more right than the corner 613 is marked "*". Since the feature point needs to be reflected when the rearview mirror display mode is selected, the feature point to be marked "*" needs to be a point within the adjustment range.

In step S513, the image processing control unit 420 provides a wait time, e.g., one second. The driver memorizes the position "*" during this wait time. In step S514, the image processing control unit 420 turns OFF the left half of the back light of the display 414 to select the rearview mirror display mode on the left-hand side. A screen 625 indicates the user interface displayed in step S514. The right-hand side of the screen displays a black character string "Touch Memorized Position *" without displaying the image captured by the camera 401.

In step S515, the image processing control unit 420 waits for a predetermined time. In step S516, the image processing control unit 420 determines whether the driver touched the screen between when since the processing in step S514 was performed and the processing of step S516. If the determination is that the driver touched the screen, then in step S517, the image processing control unit 420 stores the coordinates of the touched position on the touch panel 426 in a memory (not illustrated).

Turning to the processing group in step S520, in step S521, the image processing control unit 420 turns ON the back light of the display 414 to select the electronic mirror display mode. In step S522, the image processing control unit 120 displays one feature point at the lower-right corner of the electronic mirror and a UI. The UI will be described below with reference to FIG. 6.

A screen 630 indicates the user interface displayed in step S522.

The left-hand side of the LCD 414 displays a black character string "Memorize Position *" without displaying the image captured by the camera 401. The position "*" indicates the coordinates where the feature point detection circuit 427 detects a feature point. A plurality of points is selected after the feature point is extracted from the video. According to the present exemplary embodiment, the feature point closest to the corner 614 from among the feature points upper and more left than the corner 614 is marked "*". Since the feature point needs to be reflected when the rearview mirror display mode is selected, the feature point to be marked "*" needs to be a point within the adjustment range.

In step S523, the image processing control unit 420 provides a wait time, e.g., one second. The user memorizes the position * during this wait time. In step S524, the image processing control unit 420 turns OFF the right half of the back light of the LCD 414 to select the rearview mirror display mode on the right-hand side.

A screen 635 indicates the user interface displayed in step S524. The left-hand side of the screen 414 displays a black character string "Touch Memorized Position *" without displaying the video captured by the camera 401.

In step S525, the image processing control unit 420 waits for a predetermined time. In step S526, the image processing control unit 420 determines whether the touch panel 426 is touched during the wait time in step S525. If the screen is determined to be touched, then in step S527, the image processing control unit 420 stores the coordinates of the touched position in a memory (not illustrated). If the screen is not determined to be touched, the flow returns to step S521.

In step S531, the image processing control unit 420 adjusts the upper-left feature point coordinates to coincide with the upper-left touch coordinates. In step S532, the image processing control unit 420 adjusts the lower-right feature point coordinates to coincide with the lower-right touch coordinates. The process then returns to step S502.

FIG. 7 illustrates the processing in steps S517 and S527. Reference number. 701 illustrates a state where the touch and the feature point coordinates are plotted. White asterisks indicate the touch coordinates, while black asterisks indicate the feature point coordinates. In step S531, the image processing control unit 420 changes the image clipping range so that the upper-left black asterisk coincides with the upper-left white asterisk, as illustrated in reference number 702. Changing the clipping range enables obtaining the same effect as the effect of moving the entire image to the position drawn with broken lines.

In step S532, the image processing control unit 420 reduces the image displayed on the electronic mirror so that the lower-right black asterisk coincides with the lower-right white asterisk, as illustrated in reference number 703. As a result of this processing, the viewing angle of the rearview mirror and the viewing angle of the electronic mirror are approximately the same.

The above-described series of processing enables switching the mode between the rearview mirror display mode and the electronic mirror display mode, enabling the driver to check whether the viewing angles are the same. When the driver touches feature points, the viewing angle of the rearview mirror and the viewing angle of the electronic mirror can be the same with high accuracy. More specifically, the touch operation makes it easier to adjust the viewing angle of the video displayed on the display apparatus in the vehicle. According to the present exemplary embodiment, it is not necessary to strictly match the mechanical relative relation between the camera 101 installed in the rear of the vehicle and the main body 102 installed at the position of the rearview mirror. Thus, the camera 101 and the main body 102 can be easily installed.

Example variations of exemplary embodiments include a combination of the first and the second exemplary embodiments. Example variations also include the second exemplary embodiment providing enhancements to currently known configurations.

While exemplary embodiments have been provide, these embodiments are not seen to be limiting. Diverse embodiments not departing from the spirit and scope of the present disclosure are applicable.

The present disclosure also includes embodiments where a program of software for implementing the functions of the above-described exemplary embodiments is supplied to a system or an apparatus having a computer that executes the program, from a recording medium directly or via wired or wireless communication, and the computer executes the program.

To implement the functions and processing of the present disclosure with a computer, the program code itself supplied to and installed on the computer also implements the present disclosure. The computer program itself for implementing the functions and processing of the present disclosure is also included in the present disclosure.

The computer program can be provided in any form, such as an object code, an interpreter-executable program, and script data supplied to an operating system (OS), as long as these forms have program functions.

Examples of recording media for supplying a program include a magnetic recording medium such as a hard disk and a magnetic tape, a magneto-optical storage medium, and a nonvolatile semiconductor memory.

An example method for supplying a program, a computer program for forming the present invention is stored on a server on a computer network, and a connected client computer downloads the computer program and performs programming.

Other Embodiments

Embodiment(s) can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like. While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-090422, filed Jun. 2, 2022, which is hereby incorporated by reference herein in its entirety.

What is claimed is:

1. A display apparatus comprising:
a display configured to display an image captured by an imaging unit configured to capture an image of a view behind a moving object;
a half mirror configured to reflect the view behind the moving object and disposed on an anterior surface of the display;
one or more memories storing instructions; and
one or more processors executing the instructions to:
(i) adjust a viewing angle of the image displayed on the display, wherein the viewing angle after adjustment is different from the viewing angle before adjustment;
(ii) switch a state from a mirror surface display state where a reflection image on the half mirror is displayed to an image display state where the image is displayed on the display;
(iii) switch the state from the image display state where the image is displayed on the display to the mirror surface display state where the reflection image on the half mirror is displayed; and
(iv) repeat (i), (ii), and (iii) until a predetermined condition is satisfied.

2. The display apparatus according to claim 1, wherein, to adjust the viewing angle of the image, the one or more processors further execute the instructions to:
clip, enlarge, and reduce a video on the display.

3. The display apparatus according to claim 1, wherein the one or more processors further execute the instructions to:
adjust the viewing angle of the image according to a predetermined sequence of viewing angles, wherein each viewing angle in the predetermined sequence is different from every other viewing angle in the predetermined sequence.

4. The display unit according to claim 1, wherein the one or more processors further execute the instructions to:
receive an operation for determining the viewing angle to be displayed on the display, wherein receipt of the operation satisfies the predetermined condition; and
determine the viewing angle to be displayed on the display upon receipt of the operation.

5. The display apparatus according to claim 4, further comprising a touch panel configured to specify one or more positions in the image,
wherein the one or more processors further execute the instructions to:
extract feature points of the image displayed on the display;
acquire respective specified positions of the feature points in the mirror surface display state, and
determine the viewing angle displayed on the display so that the respective positions of the feature points in the image are in a vicinity of the respective specified positions.

6. The display apparatus according to claim 1, wherein the one or more processors further execute the instructions to repeat (i), (ii), and (iii) at predetermined intervals until the predetermined condition is satisfied.

7. The display apparatus according to claim 1, wherein the one or more processors further execute the instructions to repeat (i), (ii), and (iii) until the predetermined condition is satisfied while the moving object is in a stop state.

8. The display apparatus according to claim 7, wherein the one or more processors further execute the instructions to determine that the moving object is in the stop state based on a state of a shift lever of the moving object being in a parking state.

9. The display apparatus according to claim 1, wherein the one or more processors further execute the instructions to begin performing (i), (ii), (iii), and (iv) in response to a receiving a signal that indicates that a viewing angle of the half mirror has been changed.

10. A method for controlling a display apparatus including a display configured to display an image captured by an imaging unit configured to capture an image of a view behind a moving object and a half mirror configured to reflect the view behind the moving object and disposed on an anterior surface of the display, the method comprising:
(i) adjusting a viewing angle of the image displayed on the display, wherein the viewing angle after adjustment is different from the viewing angle before adjustment;
(ii) switching a state from a mirror surface display state where a reflection image on the half mirror is displayed to an image display state where the image is displayed on the display;
switching the state from the image display state where the image is displayed on the display to the mirror surface display state where the reflection image on the half mirror is displayed; and
(iv) repeating (i), (ii), and (iii) until a predetermined condition is satisfied.

11. A non-transitory computer-readable storage medium storing computer-executable instructions for causing a computer to execute a method to control a display apparatus including a display configured to display an image captured by an imaging unit configured to capture an image of a view behind a moving object and a half mirror configured to reflect the view behind the moving object and disposed on an anterior surface of the display, the method comprising:
- (i) adjusting a viewing angle of the image displayed on the display, wherein the viewing angle after adjustment is different from the viewing angle before adjustment;
- (ii) switching a state from a mirror surface display state where a reflection image on the half mirror is displayed to an image display state where the image is displayed on the display;
- (iii) switch the state from the image display state where the image is displayed on the display to the mirror surface display state where the reflection image on the half mirror is displayed; and
- (iv) repeating (i), (ii), and (iii) until a predetermined condition is satisfied.

12. The display apparatus according to claim 1, wherein the predetermined condition is a receipt of a predetermined signal.

13. The display apparatus according to claim 12, wherein the predetermined signal is generated by an input device in response to a user operation of the input device.

14. The display apparatus according to claim 13, wherein the half mirror includes the input device.

15. The display apparatus according to claim 6, wherein the predetermined intervals are less than a minute.

16. The display apparatus according to claim 15, wherein the predetermined intervals are less than ten seconds.

17. The display apparatus according to claim 9, wherein the signal that indicates that the viewing angle of the half mirror has been changed is generated by a sensor that detects changes to the viewing angle of the half mirror.

18. The display apparatus according to claim 17, wherein the half mirror includes the sensor.

19. The display apparatus according to claim 1, wherein the one or more processors further execute the instructions to perform (ii) for less than 30 seconds before performing (iii).

* * * * *